Aug. 1, 1967
P. T. KOMISKE
3,334,220
MAGNETICALLY ATTACHED FOG LIGHT FILTER
FOR VEHICLE HEADLIGHTS
Filed May 13, 1963
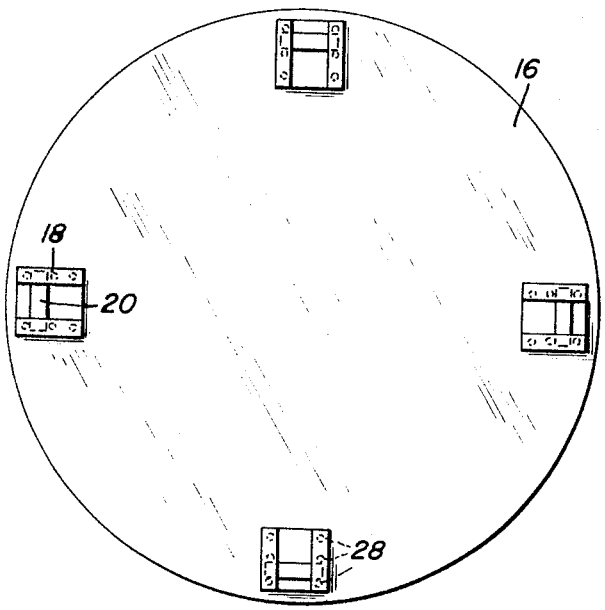
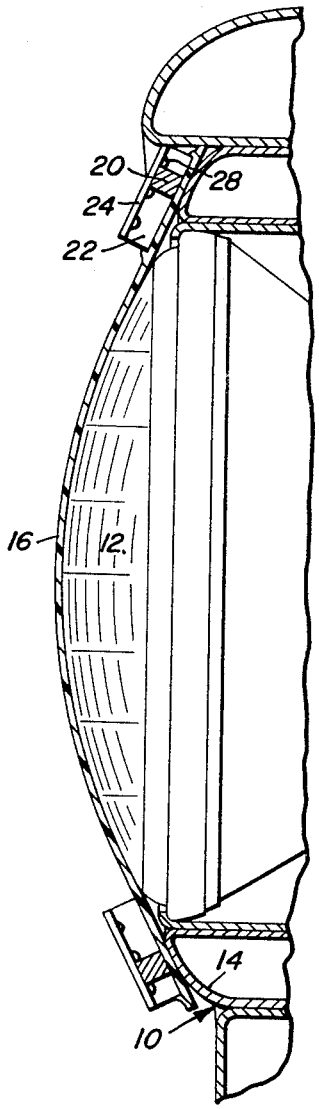
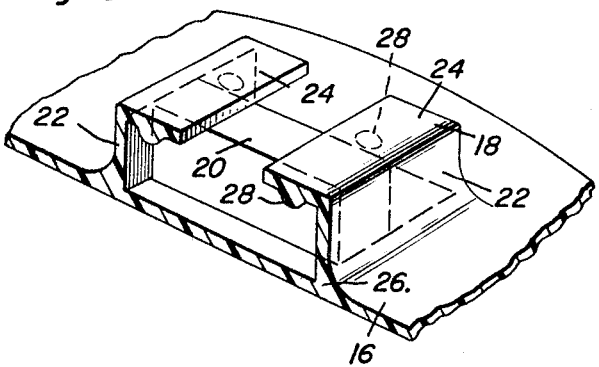
Patrick T. Komiske
INVENTOR.
BY *Clarence A. O'Brien*
*and Harvey B. Jacobson*
Attorneys

United States Patent Office 3,334,220
Patented Aug. 1, 1967

3,334,220
MAGNETICALLY ATTACHED FOG LIGHT FILTER
FOR VEHICLE HEADLIGHTS
Patrick T. Komiske, 8600 16th St.,
Silver Spring, Md. 20910
Filed May 13, 1963, Ser. No. 279,703
1 Claim. (Cl. 240—46.57)

This invention comprises a novel and useful magnetically attached fog light filter and more particularly pertains to an attachment readily applicable to or removable from the headlights of an automotive vehicle in order to convert the conventional headlight into a fog light thereby enabling safer and more effective use of the automobile lights during a fog.

It is well known that conditions of fog seriously interfere with the effective use of automotive vehicle headlight systems and in fact frequently by the reflected glare of the light beam from the fog particles tend to blind the driver of the vehicle as well as the drivers of approaching vehicles. It is also known, however, that light filters of various types tend to a large extent overcome this difficulty. However, the use of such light filters with conventional automobile headlights has not been too successful because of a number of factors such as the lack of ease in the application of the filters to the headlights when their use is required, the effectiveness of the filter attaching means and the like.

It is therefore the primary object of this invention to largely overcome the above-mentioned difficulties through the provision of a fog filter especially efficacious for converting a conventional automobile vehicle headlight into an effective fog penetrating light.

A further object of the invention is to provide a light filtering attachment in accordance with the preceding object which may be readily and easily applied to or removed from the conventional vehicle headlights without the necessity for any alterations in the structure or mounting of the latter.

A still further purpose of the invention is to provide a fog filtering attachment for conventional vehicle headlights which shall employ magnets as a means for securely retaining the filter in place by permitting its ready removal from or its quick attachment to a conventional headlight as may be desired.

Still another purpose of the invention is to provide a fog filtering attachment in accordance with the preceding objects wherein the magnet holding means are secured to and associated with the filtering element in a greatly improved manner, one which will permit ready replacement of the filter element from the magnetic holding means as may be desired, and wherein the magnetic holding means may be adjustably secured upon the filtering element so as to adapt the device to use with different sizes and types of headlights.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a plan view showing a fog filter attachment in accordance with this invention;

FIGURE 2 is a view in vertical longitudinal section through a portion of a vehicle headlight and showing the filtering attachment of this invention applied thereto; and, FIGURE 3 is a fragmentary perspective view upon an enlarged scale showing the manner in which the magnet holding means are detachably mounted upon the filter element of the invention.

In illustrating a preferred manner in which the principles of this invention may be satisfactorily practiced, there is indicated by the numeral 10 a portion of a conventional motor vehicle electric headlight, including the usual headlight lens 12 and a metallic rim 14 surrounding the same and which rim is preferably of a suitable magnetic or magnetically attractable material. As will be noted, the rim projects beyond the periphery of the headlight lens, which latter may be of any suitable type such as the conventional sealed beam headlight units and the like.

The filter attachment of this invention consists of a pliable sheet 16 of a translucent material and of a generally circular shape.

While various translucent materials may be employed in accordance with this invention, a material which is capable of passing wave lengths of 5893 Angstroms only is considered to be especially suitable. It is essential for the purposes of this invention that the material selected shall be capable of converting a light beam from a conventional vehicle headlight into a fog penetrating beam. Inasmuch as the invention set forth and claimed hereinafter does not reside in any particular composition or material for this purpose, but rather in the manner in which the material is adapted for use as a fog attachment, a further description thereof is deemed to be unnecessary.

As above mentioned, the translucent filter disk 16 is of generally circular shape and is of sufficient size to enable it to be spread smoothly over the convex surface of the lens 12 and completely cover the lens or at least completely cover the light transmitting portion thereof, with preferably a portion of the periphery of the sheet overlying the headlight rim 14 as shown in FIGURE 2. In some instances, the sheet may be circular and planar while in other instances it may be fabricated with a natural spherical curvature to enable it to conform to the spherical contour of the lens.

The sheet is provided with a plurality of retaining means in the form of pockets 18 by means of which permanent magnets 20 may be detachably secured to the sheet and serve as a means for attachably securing the sheet to the headlight.

Referring to FIGURE 3 it will be observed that a preferred and satisfactory construction of a pocket 18 comprises an integral pair of side walls 22 rising from the outer surface of the sheet with respect to the side engaging the lens 12, and the side walls 22 being substantially perpendicular to the plane of the sheet 16, are provided with inturned flanges 24 extending towards each other and overlying and being substantially parallel to but in spaced relation to the sheet 16.

The side walls 22 are of sufficient height and are spaced from each other a sufficient distance to cause them to resiliently and snugly grip the permanent magnet 20 therebetween when the latter is slid longitudinally of and into the pocket. If desired, the side walls with their flanges may be separately formed and applied to the sheet in any suitable manner. It is preferred however in the interest of economy to form the sheet with the pockets as an integral member with the side walls being appropriately reinforced or strengthened as by being thickened as at 26 at their junction with the sheet.

Preferably although not necessarily, the pockets are disposed in circumferentially spaced relation about the peripheral portion of the outer side of the sheet 16 and have their channels which lie between the side walls disposed substantially radially of the circular sheet. Any desired number of the pockets may be provided, four being found to be satisfactory for one practical construction in accordance with this invention.

Means are provided for releasably securing the permanent magnets 20 in the pockets and further to secure the magnets in radially adjusted positions upon the sheet in order to adapt the magnets to effectively engage headlight rims of different diameters. For this purpose, each of the flanges 24 is provided with a plurality of longitudinally spaced downwardly extending projections as at 28 which are so spaced that a pair of adjacent longitudinally spaced projections will snugly receive therebetween and resiliently grip the opposite faces of one of the magnets 20. Consequently, by positioning a magnet between selected pairs of adjacent projections, the magnet may be radially adjusted with respect to the axis of the headlight and thus cause the magnets to effectively and properly be disposed with respect to the metallic and magnetic rim 14.

The construction as described permits the magnets to be readily removed when it is desired to clean or replace the fog filter sheet 16, and it is evident that the device may be quickly and easily applied to or removed from a headlight when its use may be required and the attachment may be readily folded for storage in a compact manner.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A detachable fog light filter for automobile headlights of the type having a lens and a metallic rim of a magnetic material about the lens, said filter consisting of a sheet of a translucent material having the property or filtering a beam of white light from a headlight and converting it to a fog penetrating beam, said sheet being of a size and shape to substantially cover the light transmitting front surface of said lens and overlap said rim, magnets secured to said sheet at its periphery and engageable with and magnetically attachable to said rim whereby to maintain the sheet in a light filtering position across said lens, said sheet being circular and having pockets upon its face which is remote from said lens, said pockets extending radially thereof and spaced circumferentially about the sheet circumference, each magnet being radially adjustably mounted in one of said pockets, each pocket consisting of parallel side walls rising perpendicularly from said sheet face, said parallel side walls having inturned flanges projecting towards each other and overlying said sheet face, said walls and flanges frictionally and resiliently gripping said magnets, said flanges having a plurality of projections extending toward said sheet face for engagement with said magnets for retaining the latter in said pockets, said projections being spaced longitudinally of said flanges for engaging opposite edges of a magnet whereby said magnets may be retained in said pockets in selective adjusted positions.

References Cited
UNITED STATES PATENTS

| | | |
|---|---|---|
| 2,544,378 | 3/1951 | Cyr _____ 88—113 X |
| 2,744,187 | 5/1956 | Moak. |
| 3,191,025 | 6/1965 | Harker. |

FOREIGN PATENTS

| | | |
|---|---|---|
| 862,733 | 3/1961 | Great Britain. |
| 196,515 | 8/1938 | Switzerland. |

DAVID H. RUBIN, *Primary Examiner.*

J. G. BOLTEN, *Assistant Examiner.*